United States Patent [19]

Vallomy

[11] Patent Number: 4,795,139

[45] Date of Patent: Jan. 3, 1989

[54] APPARATUS FOR TAPPING SLAG-FREE STEEL FROM A CONTINUOUS MELTING FURNACE

[75] Inventor: John A. Vallomy, Charlotte, N.C.

[73] Assignee: Intersteel Technology, Inc., Charlotte, N.C.

[21] Appl. No.: 72,388

[22] Filed: Jul. 13, 1987

[51] Int. Cl.⁴ ............................................. C21C 5/42
[52] U.S. Cl. .................................... 266/236; 266/271
[58] Field of Search ..................... 266/44, 45, 91, 99, 266/271, 236

[56] References Cited

U.S. PATENT DOCUMENTS 3,917,111 11/1975 Berthet et al. ...................... 266/91
4,475,721 10/1984 Pamart .............................. 266/236
4,523,747 6/1985 Schnitzer et al. .................... 266/44
4,679,773 7/1987 Wunsche .............................. 266/45

Primary Examiner—L. Dewayne Rutledge
Assistant Examiner—S. Kastler
Attorney, Agent, or Firm—Ralph H. Dougherty

[57] ABSTRACT

A method and apparatus for tapping a metal refining furnace which is tiltable about a horizontal axis, including an externally mounted chamber or "hot spout" at the side of the furnace communicating with the interior of the furnace, a nozzle situated in the bottom wall of the chamber, stopper rod or sliding gate means associated with the chamber for closing the nozzle opening, and heating means in the chamber for maintaining a high temperature within the chamber. An associated receiving vessel is capable of monitoring the amount of molten metal in the vessel and generating a signal to stop the pouring operation.

21 Claims, 5 Drawing Sheets

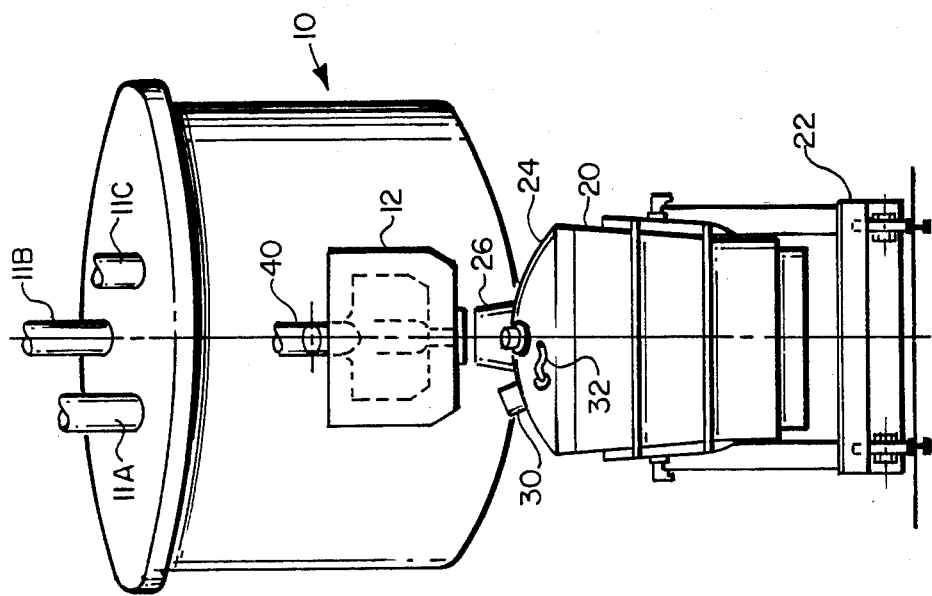
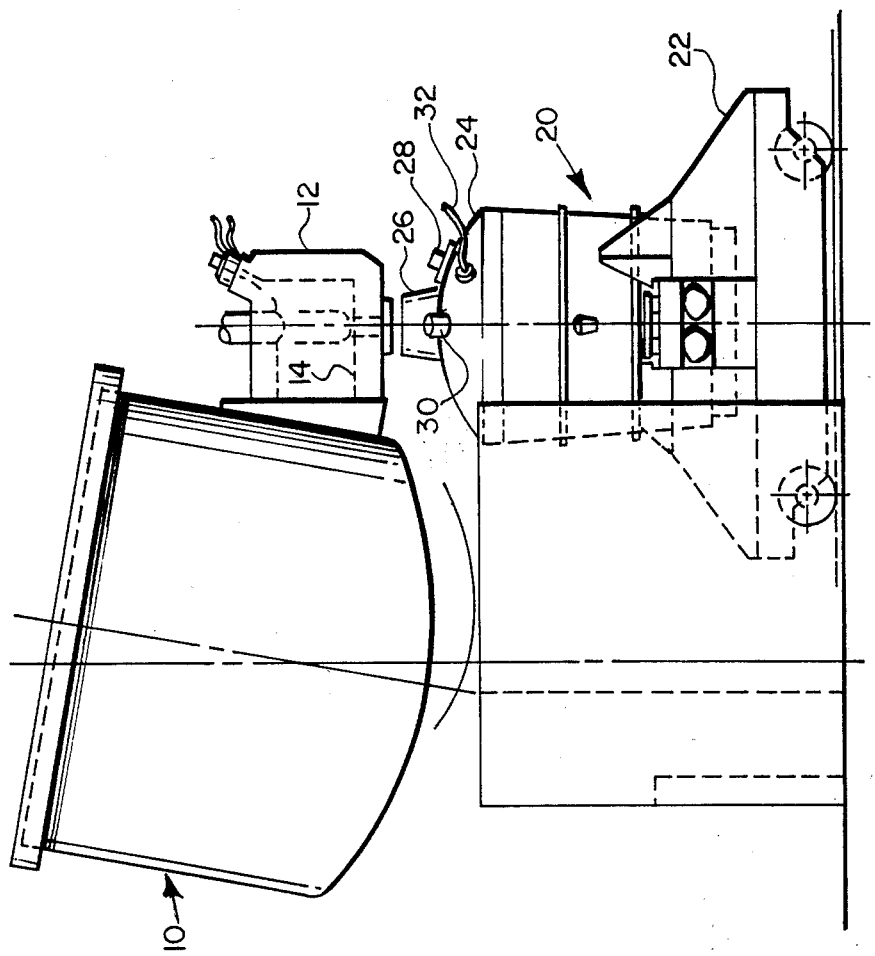

ated and an inclined nozzle when the furnace is tilted, which results in a ragged pouring stream and excessive wear of the nozzle refractory. The reference also provides a ferrostatic head above the pouring nozzle at all times during the refining period. Because of the presence of this ferrostatic head above the pouring nozzle when the bath is totally molten, failure of nozzle shut-off devices have resulted in several accidents at furnaces equipped with such arrangements.

APPARATUS FOR TAPPING SLAG-FREE STEEL FROM A CONTINUOUS MELTING FURNACE

BACKGROUND OF THE INVENTION

The present invention relates to steelmaking furnaces, particularly electric arc steelmaking furnaces which are mounted for tilting. More particularly, the invention relates to means for tapping such furnace exterior to the furnace, and is especially advantageous when utilizing continuous feeding.

Schnitzer et al. U.S. Pat. No. 4,523,747 teaches a method and apparatus for tapping a smelting furnace, generally of the electro-plasma type. This patent shows that the furnace walls extend outwardly from the furnace beneath the watercooled walls to form a generally trapezoidal region having a common bottom with the main portion of the furnace. In addition, this patent has a vertical discharge nozzle when the furnace is not tilted and an inclined nozzle when the furnace is tilted, which results in a ragged pouring stream and excessive wear of the nozzle refractory. The reference also provides a ferrostatic head above the pouring nozzle at all times during the refining period. Because of the presence of this ferrostatic head above the pouring nozzle when the bath is totally molten, failure of nozzle shut-off devices have resulted in several accidents at furnaces equipped with such arrangements.

SUMMARY OF THE INVENTION

A tiltable metal melting furnace is provided with an exterior projection which comprises a "hot spout" or hot chamber for pouring or teeming the molten metal from the interior of the furnace or vessel. The projection is refractory lined and has a steel shell in the same manner as the furnace. Preferably a stopper rod apparatus provides the closure member for the furnace pouring spout. This external chamber is inclined, preferably at an angle of about 10°, so that in the pouring position the chamber bottom will be level and the nozzle orifice will be vertical. A metal receiving ladle is provided with means for preheating, for making alloy addition, and for preventing oxidation of the molten metal therein.

OBJECTS OF THE INVENTION

It is the principal object of this invention to provide apparatus for tapping an electric arc metal smelting or refining furnace which is positively controllable to avoid slag being poured into a receiving vessel along with the molten metal.

It is another object of this invention to provide apparatus means for tapping a pre-determined exact tonnage of metal from the furnace, as desired.

It is also an object of this invention to provide apparatus which will allow the molten metal stream to be protected from air during tapping.

It is another object of this invention to provide means for maintaining high heat in the region of the pouring nozzle orifice during the melting and refining periods.

It is another object of this invention to provide a method and apparatus for pouring molten steel into a ladle.

It is another object of this invention to provide a process in which primary alloy additions are made in the ladle during the tapping procedure.

It is another object of this invention to provide means for preventing contamination of molten metal in the ladle during tapping.

It is another object to provide means for tapping a continuously fed steelmaking vessel without requiring interruption of the feeding process.

These and other objects will become more readily apparent by referring to the following detailed description and the appended drawings.

BRIEF DESCRIPTION OF THE DRAWINGS

FIG. 1 is a schematic side elevational view of a steelmaking furnace utilizing the tapping apparatus of the invention with a covered ladle.

FIG. 2 is an end view of the apparatus shown in FIG. 1.

DETAILED DESCRIPTION

Figure 3:
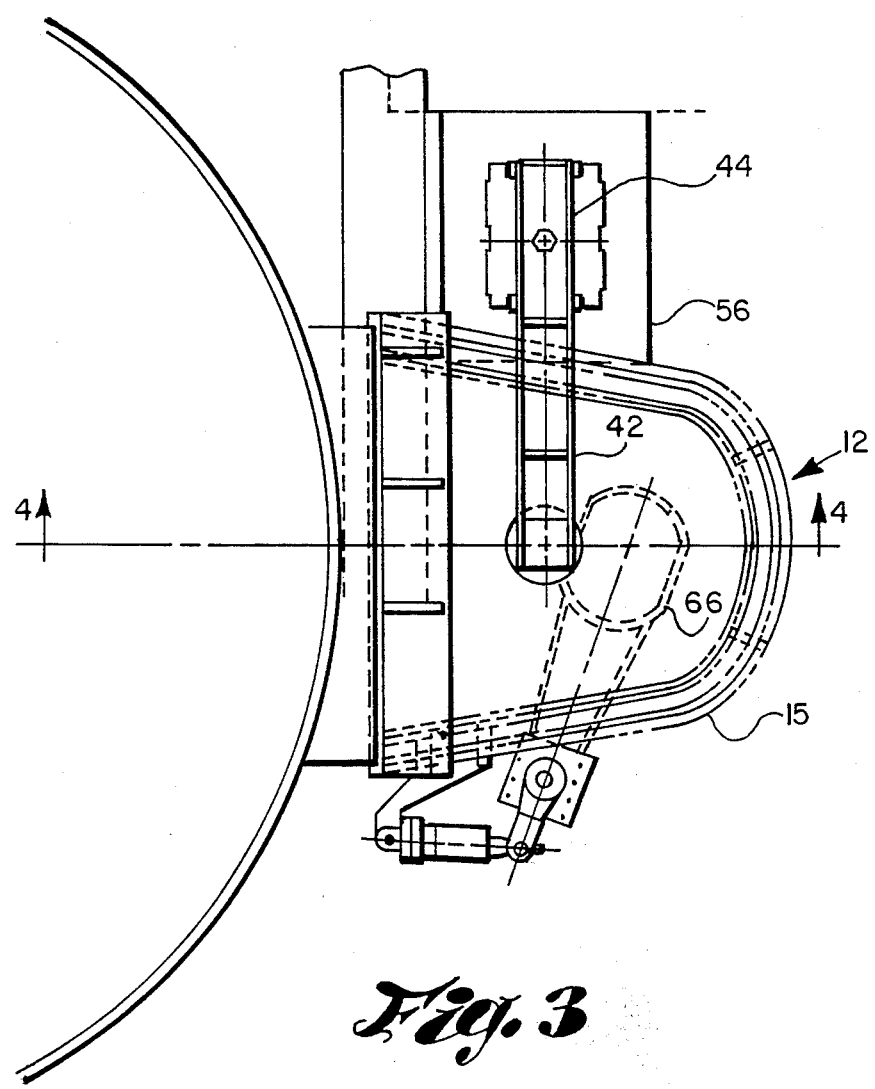
FIG. 3 is a detailed top view of the furnace and tapping chamber in accordance with the invention.

Refering now to the drawings, particularly FIGS. 1 and 3, furnace 10, having electrodes 11A, 11B, and 11C, is mounted for tilting about a horizontal axis of rotation, and carries an exterior projection 12 which comprises a "hot spout" or hot chamber for pouring or teeming the molten metal from the interior of the furnace or vessel 10. The pouring chamber 12 has a refractory lining 14 and a steel shell 15 in the same manner as the furnace 10.

The pouring chamber 12 is adapted to teem directly into a receiving ladle 20 as shown in FIGS. 1 and 2. The ladle 20, which is advantangeously mounted on a rail car 22, has a cover 24 with a central receiving opening 26, a burner 28 and an opening 30 for primary alloy additions. In addition, the cover 24 is provided with injections means 32 for introducing inert gas to the interior of the ladle. In addition, shielding means such as an inert gas shield can be provided to protect the pouring stream between the pouring nozzle and the ladle from oxidation by air. This is advantageously accomplished by injecting inert gas through inlet 32 and allowing the inert gas to leave the ladle through the central opening 26 around the pouring stream.

Figure 4:
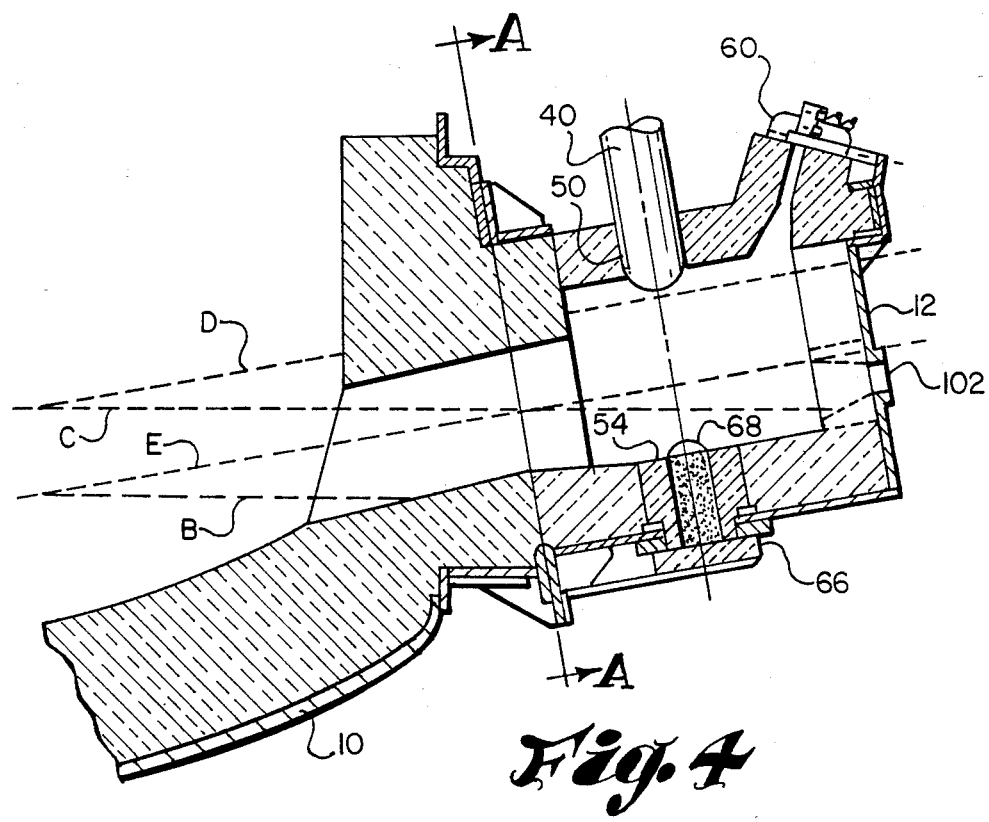
FIG. 4 is a sectional view of a portion of the furnace and the external pouring chamber taken along line 4—4 of FIG. 3.
Figure 5:
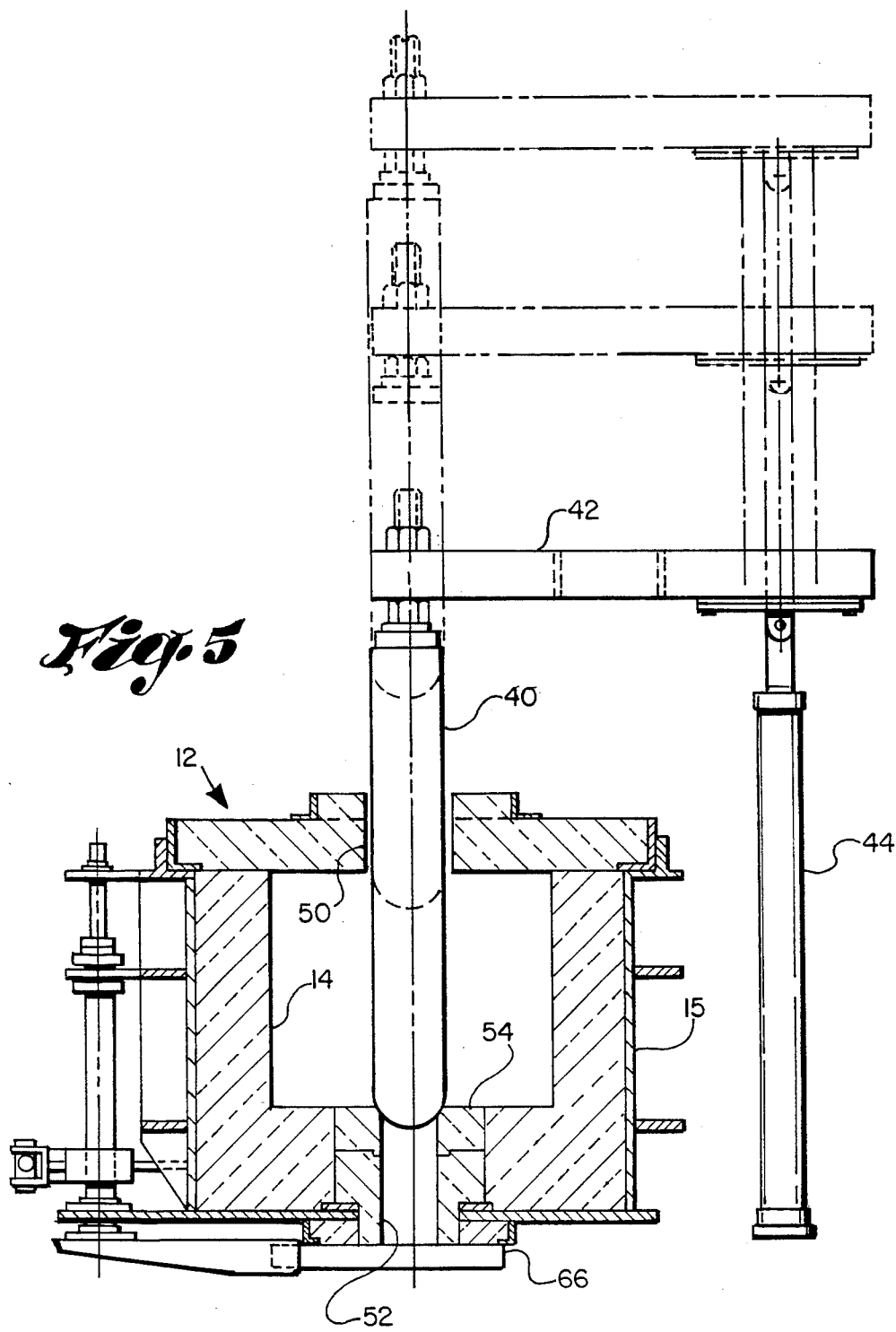
FIG. 5 is vertical sectional view of the embodiment of the pouring chamber shown in FIG. 4, but taken at right angles to the section of FIG. 4.

In the preferred embodiment of the hot spout or pouring chamber 12, which is best shown in FIG. 5, a stopper rod 40 is mounted on a stopper rod support arm 42 which is connected to a means for raising and lowering the stopper rod 40, such as piston assembly 44. The stopper rod 40 is adapted for insertion through hole 50 in the top of the hot chamber and to be seated in the top of the orifice 52 of pouring nozzle 54. As shown in FIG. 3, the piston assembly 44 is readily mounted on a support plate 56 which is associated with the pouring chamber or its support. Note that the pouring chamber apparatus can readily be detached from the furnace vessel itself along line A—A shown in FIG. 4. Burner 60, which is preferably angularly placed in the upper portion of the pouring chamber 12, is directed generally at the orifice 52 of pouring nozzle 54 in order to maintain the interior of the chamber at a high temperatue.

The plunger or stopper rod 40 closes off the steel stream quickly and effectively when the desired weight of molten and metal has accumulated in the ladle 20. This also keeps slag from reaching the ladle. The stopper rod is not required when a slide gate closure member is utilized.

The burner 60 is activated to maintain the temperature within the pouring chamber 12 sufficiently high that there is no frozen steel or slag within the hot spout or chamber 12.

The steel level within the chamber 12 is sufficiently high when the furnace is tilted to about ten degrees that no slag is sucked into the nozzle by the action of eddy currents within the molten metal in the chamber.

When the furnace 10 is returned to the vertical position after tapping, a heel of molten metal remains in the furnace, which allows continuous melting, and concomitantly continuous feeding. The chamber 12 is then free of steel and/or slag because the bottom of the chamber is inclined about ten degrees toward the furnace, which causes all molten metal to flow into the furnace. With no molten material in the chamber 12, it is possible to refill the nozzle orifice with refractory sand or particulate refractory 68 by lifting the stopper rod 40 to a position clear of hole 50 in the top of the chamber 12, then introducing refractory sand 68 through hole 50 and nozzle orifice to rest on retainer 66.

There is no ferrostatic head of steel above the nozzle 54 during the melting and refining operation until continuous feeding of charged materials has raised the bath level to a sufficient height that it enters the chamber 12. Tapping can be effected before this occurs, if desired. Alternatively, if it is desired to maintain the chamber free of steel and slag, this can be accomplished by tilting the furnace slightly in the reverse direction from the tapping direction i.e. toward the slag door (not shown).

The furnace 10 is tapped by tilting it about 8 to about 15 degrees, preferably about 10 degrees, and it can be completely drained by tilting it about 25 degrees, rotating the exterior pouring chamber 12 downwardly.

The invented tapping system is effective also in batch operations.

The ladle cover 24 allows heating, or preheating, of the ladle 20 at all times until tapping begins. During tapping, the ladle is flushed with inert gas to prevent air from coming in contact with the steel or other molten metal therein.

Beneath the chamber 12, and pivotally mounted thereto as shown in FIGS. 3 and 5, is a retainer 66, shaped like a paddle or tennis racket, for holding granularly refractory 68 in the nozzle orifice 52 between tappings.

The following summarizes the operation of the invented process:

In operation, pouring nozzle orifice 52 is closed, burner 60 is fired with the furnace 10 in the vertical position, and maintains the temperature in the chamber 12 at least 1200 degrees, preferably above 1450 degrees. The heel of molten metal is at the level indicatd by bath line B in FIG. 4. During the process of feeding, melting and refining, the bath line rises to level C as indicated in FIG. 4. As soon it is desired to tap the molten metal bath, operation of burner 60 is stopped, the furnace is tiltd by lowering the pouring opening whereupon the bathline is as indicated by line D in FIG. 4. The pouring nozzle is opened by raising stopper rod 40. A compact stream is thereupon initiated which taps the heat in a period of about 2 to 3 minutes with a nozzle diameter of appropriate dimension.

The ladle into which the heat is tapped is mounted on an appropriate load cell or cells which generate a signal when the desired weight of molten metal has entered the ladle. Nozzle orifice 52 is thereupon immediately closed by stopper rod 40, ceasing the pour, with the level generally as indicated by dotted bath line E in FIG. 4. The furnace is returned to the vertical operating position, the stopper rod 40 is removed from orifice 50, stopper rod 40 is lifted free of orifice 50, and refractory sand is placed in the nozzle opening. Burner 60 is once more fired, which generates a crust atop the refractory sand 68, and stopper rod 40 is replaced into orifice 50 as shown in FIG. 4, or a cover (not shown) is placed over orifice 50, to prevent the introduction of air to the chamber. The burner 60 is controlled to provide a neutral flame, that is, one which is neither oxidizing nor reducing to the metal.

ALTERNATIVE EMBODIMENTS

Figure 6:
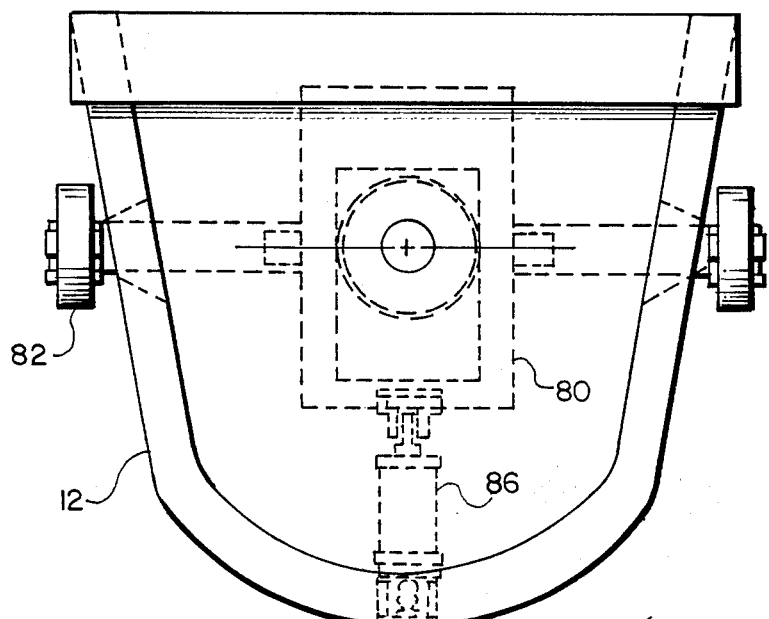
FIG. 6 is a top view of an alternative pouring chamber embodiment utilizing a slidable gate closure member.
Figure 7:
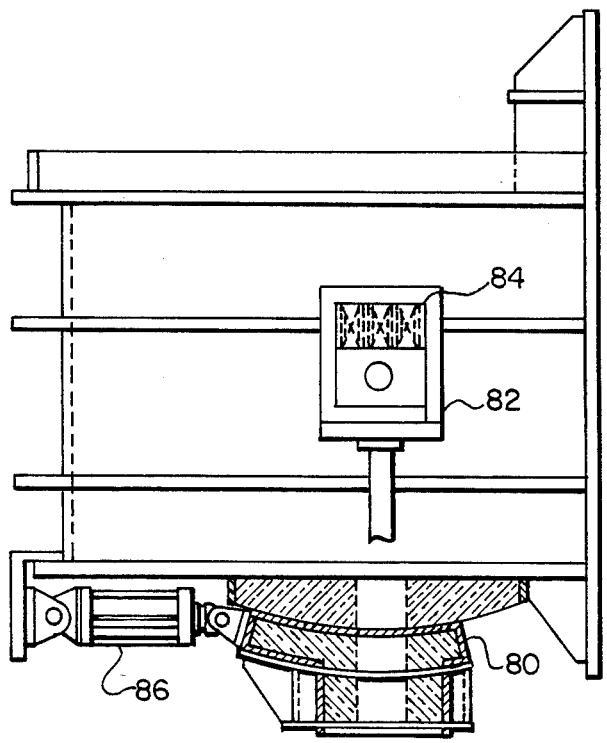
FIG. 7 is a partially sectioned side view of FIG. 6.

In an alternative embodiment shown in FIG. 6, a slidable gate closure member 80 is suspended beneath the hot chamber by a support means 82. As shown in FIG. 7, the support means includes preloaded compression springs 84 to maintain the necessary upward pressure on the curved slidable gate, which is powered by a cylinder-driven piston 86.

Figure 8:
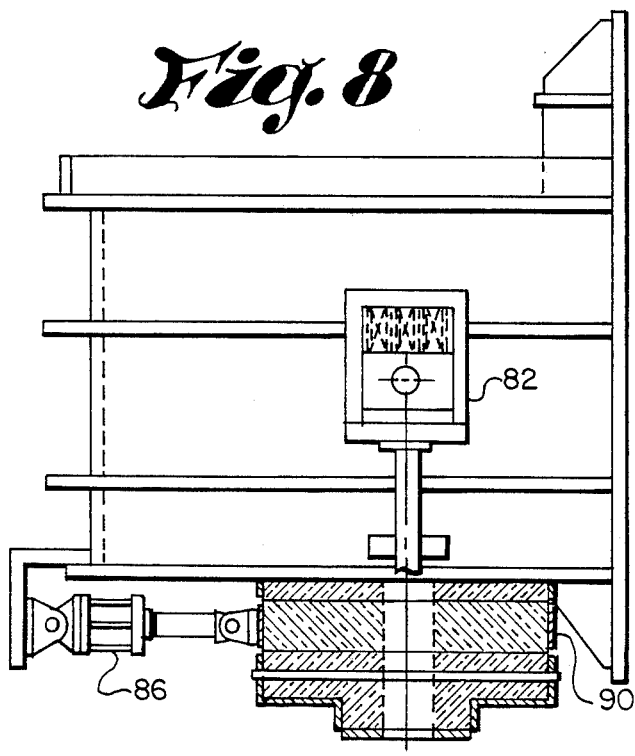
FIG. 8 is a partially sectioned side view of an alternative slidable gate closure embodiment.
Figure 9:
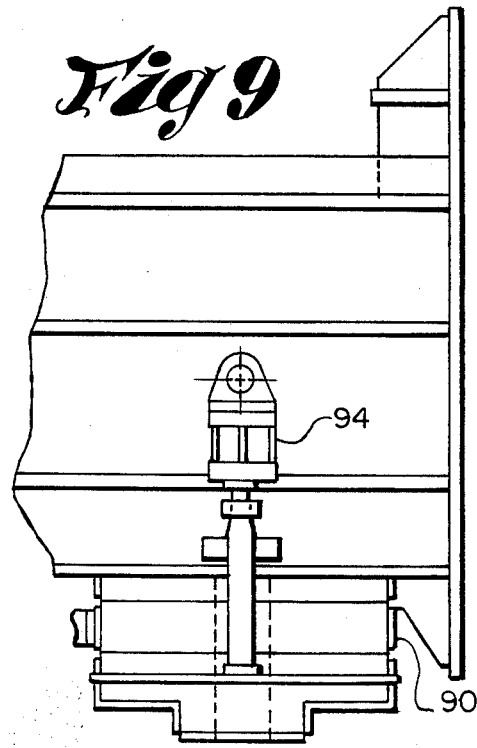
FIG. 9 is a side view of an alternative embodiment of means for supporting a slidablee gate closure member.

FIG. 8 shows an alternative sliding gate embodiment wherein the closure member 90 is flat rather than curved. Figure 9 shows an alternative support member for the slidable gate wherein the upward pressure is provided by fluid operated cylinders 94.

Also alternatively, it is possible to tap or drain the furnace through a refractory-covered end orifice 102 as indicated in FIG. 4, by removing the refractory. This is generally intended as an emergency procedure. However, if this becomes a desired means of tapping, the end orifice could be controlled by a slidable gate since only a very low ferrostatic head would create any pressure against any such pouring outlet.

What is claimed is:

1. Apparatus for tapping a steelmaking furnace, which furnace is tiltable about a horizontal axis, comprising:

an external refractory-lined chamber mounted on a sidewall of the steelmaking furnace, said chamber communicating with the interior of the furnace, said chamber being inclined upwardly from the furnace at about 8 to about 15 degrees, the furnace having an upright melting and refining position and a tilted pouring position;

a nozzle having an orifice therein situated in the bottom wall of said external chamber, wherein the centerline of the nozzle orifice is vertical when in the pouring position;

means associated with said chamber for closing said nozzle opening; and means associated with said chamber for directly heating the interior of said chamber.

2. Apparatus according to claim 1 wherein the internal bottom of said chamber is horizontal when the furnace is tilted about 10 degrees into the pouring position.

3. Apparatus according to claim 1 wherein said means for closing said nozzle opening is a stopper rod.

4. Apparatus according to claim 3 wherein said stopper rod is adapted for insertion through an opening provided in the top of said chamber.

5. Apparatus according to claim 4 wherein said means for closing said nozzle opening is a slidable gate.

6. Apparatus according to claim 5 wherein said slidable gate is a flat plate.

7. Apparatus according to claim 5 wherein said slidable gate is a curved plate.

8. Apparatus according to claim 4 wherein said closure member is supported on the structure of said chamber.

9. Apparatus according to claim 5 wherein said closure member is supported on the structure of said chamber by supports which include preloaded compression springs therein adapted to urge said closure member upwardly.

10. Apparatus according to claim 5 wherein said closure member is supported on the structure of said chamber by supports which include a pair of fluid-operated cylinders to provide the necessary upward pressure.

11. Apparatus according to claim 4 wherein said chamber is detachable from said furnace.

12. A system for tapping a steelmaking furnace, comprising apparatus according to claim 1, and an associated molten metal ladle for receiving molten metal from said furnace.

13. Apparatus according to claim 12 wherein said ladle is mounted on a rail car.

14. Apparatus according to claim 12 wherein said ladle is provided with a cover having a metal-receiving opening therein.

15. Apparatus according to claim 14 wherein said metal-receiving opening is generally centered in said cover.

16. Apparatus according to claim 14 wherein said cover is provided with means for protecting the molten metal stream from air between outlet of said chamber and said metal-receiving opening in said ladle.

17. Apparatus according to claim 16 wherein said protection means includes gas injection means in said cover, and a source of inert gas communicating with said gas injection means.

18. Apparatus according to claim 14 wherein wherein said cover is provided with means for introducing alloy additions to said ladle.

19. Apparatus according to claim 12 further comprising means for detecting the weight of molten metal in said ladle.

20. Apparatus according to claim 19 further comprising means for generating a signal responsive to a predetermined weight of molten metal, and means responsive to said signal for closing the pouring nozzle of said pouring chamber.

21. Apparatus for tapping a steelmaking furnace, which furnace is tiltable about a horizontal axis, comprising:
an external refractory-lined chamber mounted on a sidewall of the steelmaking furnace, said chamber communicating with the interior of the furnace, said chamber being inclined upwardly from the furnace at about 8 to about 15 degrees, the furnace having an upright melting and refining position and a tilted pouring position, wherein the internal bottom of said chamber is horizontal when the furnace is tilted about 10 degrees into the pouring position;
a nozzle having an opening therein situated in the bottom wall of said external chamber;
means associated with said chamber for closing said nozzle opening; and
means associated with said chamber for directly heating the interior of said chamber.

* * * * *